United States Patent
McIlroy

(10) Patent No.: US 12,010,602 B2
(45) Date of Patent: Jun. 11, 2024

(54) FLOOD FILL MESH RADIO NETWORK

(71) Applicant: Guy McIlroy, Los Gatos, CA (US)

(72) Inventor: Guy McIlroy, Los Gatos, CA (US)

(*) Notice: Subject to any disclaimer, the term of this patent is extended or adjusted under 35 U.S.C. 154(b) by 257 days.

(21) Appl. No.: 17/467,607

(22) Filed: Sep. 7, 2021

(65) Prior Publication Data

US 2022/0141753 A1  May 5, 2022

Related U.S. Application Data

(63) Continuation of application No. 16/694,146, filed on Nov. 25, 2019, now Pat. No. 11,115,895.

(Continued)

(51) Int. Cl.
*H04W 40/02* (2009.01)
*H04L 1/00* (2006.01)
(Continued)

(52) U.S. Cl.
CPC ......... *H04W 40/023* (2013.01); *H04L 1/0013* (2013.01); *H04L 1/1621* (2013.01); *H04L 45/02* (2013.01); *H04L 45/32* (2013.01); *H04W 4/06* (2013.01); *H04W 8/26* (2013.01); *H04W 40/005* (2013.01); *H04W 40/246* (2013.01); *H04W 52/0216* (2013.01); *H04W 56/0015* (2013.01);
(Continued)

(58) Field of Classification Search
CPC ....... H04W 40/023; H04W 4/06; H04W 8/26; H04W 40/005; H04W 40/246; H04W 52/0216; H04W 56/0015; H04W 56/002; H04W 56/0075; H04L 1/0013; H04L 1/1621; H04L 45/02; H04L 45/32
See application file for complete search history.

(56) References Cited

U.S. PATENT DOCUMENTS 8,185,653 B2  5/2012  Yau et al.
11,076,336 B2  7/2021  Mcilroy
(Continued)

OTHER PUBLICATIONS

United States Patent and Trademark Office, Notice of Allowance issued in U.S. Appl. No. 16/694,248, dated May 12, 2021.
(Continued)

*Primary Examiner* — Ricky Q Ngo
*Assistant Examiner* — Stephen N Steiner
(74) *Attorney, Agent, or Firm* — Pillsbury Winthrop Shaw Pittman LLP

(57) ABSTRACT

Disclosed is an improved implementation of a flood fill mesh network that utilizes low power and does not require any network addressing or routing protocol for network message delivery. Network messages are only communicated to a network node's correspondents using broadcast network messages over a wireless network. Network messages propagate throughout the network based on each correspondent node rebroadcasting received messages to its correspondent nodes, and so on. Coordinated synchronization across network nodes can be achieved by each network node broadcasting synchronization frames to its correspondents within a synchronization window time period and thereafter adjusting its own start time for the next synchronization period to converge synchronization. A guard band may also be utilized to account for any clock drift and signal path delays between any two communicating network nodes.

20 Claims, 8 Drawing Sheets

Related U.S. Application Data

(60) Provisional application No. 62/772,467, filed on Nov. 28, 2018.

(51) Int. Cl.
| | |
|---|---|
| *H04L 1/1607* | (2023.01) |
| *H04L 45/00* | (2022.01) |
| *H04L 45/02* | (2022.01) |
| *H04W 4/06* | (2009.01) |
| *H04W 8/26* | (2009.01) |
| *H04W 40/00* | (2009.01) |
| *H04W 40/24* | (2009.01) |
| *H04W 52/02* | (2009.01) |
| *H04W 56/00* | (2009.01) |
| *H04W 84/18* | (2009.01) |

(52) U.S. Cl.
CPC ..... *H04W 56/002* (2013.01); *H04W 56/0075* (2013.01); *H04W 84/18* (2013.01)

(56) References Cited

U.S. PATENT DOCUMENTS

| | | |
|---|---|---|
| 2007/0104199 A1 | 5/2007 | Taha et al. |
| 2008/0165761 A1 | 7/2008 | Goppner et al. |
| 2010/0172275 A1 | 7/2010 | Wu et al. |
| 2010/0220658 A1 | 9/2010 | Taha et al. |
| 2011/0026500 A1 | 2/2011 | Shaffer et al. |
| 2013/0138792 A1* | 5/2013 | Preden ................ H04W 56/001 709/223 |
| 2016/0073343 A1 | 3/2016 | Szewczyk et al. |
| 2017/0156102 A1 | 6/2017 | Singh et al. |
| 2017/0181053 A1 | 6/2017 | Aoun et al. |
| 2017/0325127 A1 | 11/2017 | Raghu et al. |
| 2018/0092041 A1 | 3/2018 | Choi |
| 2018/0199297 A1 | 7/2018 | Chen et al. |
| 2020/0145906 A1 | 5/2020 | Crouthamel et al. |

OTHER PUBLICATIONS

United States Patent and Trademark Office, Notice of Allowance issued in U.S. Patent Application No. 16/694,137, dated Mar. 30, 2021.

Banaei-Kashani et al., "Criticality-based Analysis and Design of Unstructured Peer-to-Peer Networks as" Complex Systems, Third International Workshop on Global and Peer-to-Peer Computing (GP2PC), 2003, pp. 1-6.

Patent Cooperation Treaty, International Search Report for PCT/US2019/063111, dated Mar. 12, 2020, pp. 1-6.

Banaei-Kashani et al., Brief Announcement: Efficient Flooding in Power-Law Networks, 2003, downloaded from https://infolab.usc.edu/DocsDemos/BanaeiPODC2003.pdf, p. 1.

Makino, A Flooding Method for Exchanging Routing Information in Power-Law Networks, Advanced Network Architecture Research Group, Oct. 5, 2005, Osaka University, Japan, pp. 1-3.

* cited by examiner

FLOOD FILL MESH RADIO NETWORK

RELATED APPLICATIONS

This application is a continuation of U.S. patent application Ser. No. 16/694,146, filed Nov. 25, 2019, which claims benefit of U.S. Provisional Application Ser. No. 62/772,467, filed Nov. 28, 2018, the contents of both of which are hereby incorporated by reference in their entirety.

TECHNICAL FIELD

This disclosure relates generally to wireless networks, and more particularly to systems and methods for implementing an improved mesh network.

BACKGROUND

Communications networks generally involve a configuration of network nodes (e.g., network servers, database servers, etc.) and connected channels that communicate with one another and that relay network messages from a source network node to a destination network node through their respective channels over the network. Network nodes are generally capable of creating, encapsulating and broadcasting messages from one network node to the next. Given an intended destination node, communications networks may be configured to determine (i) what pathway of nodes the network message should be relayed through to ensure arrival at the destination (ii) how quickly the network message will arrive (iii) how to know when the network message has arrived (iv) how much it costs to send the network message (in terms of time and network resources as well as financial resources) and (v) how does sending the message impact the resources of neighboring nodes that will relay the message to the destination. In general, there is a trade-off between how adaptable a communication network is and how much that adaptability costs in terms of network throughput, power, and resources.

One category of communications networks includes deterministic networks. Deterministic networks are also called linear networks. Deterministic (linear) networks include addressing schemes to ensure messages reach their intended destination and routing protocols that attempt to ensure messages take the "least cost" route from the source node to the destination node. The term "least cost" can refer to a vector comprising any number of scalar quantities such as monetary cost, power cost, memory cost, time to destination cost, etc., or combinations thereof. Typically, costs can be broken down into costs of communication channels, network node resources, power required to service network nodes and transmission channels, and time required to transmit and deliver the network messages.

But deterministic networks have a number of drawbacks. First, deterministic routing protocols inhibit the ability of nodes in a network to behave dynamically in their physical relationship with one another. There are 'adaptable' network routing protocols for deterministic networks, but those protocols take time to realize that they need to adapt, as well as additional time to reconfigure themselves for the change in network topology. This may work well where routes are relatively static (e.g., when a node goes down, another one takes over), but they are known to perform poorly in a dynamic network where the nodes are physically moving in relation to one another all the time. Such a network may include networks comprising small, low-cost and low-power mobile radio devices. When network nodes consist of mobile radios, reconfiguration of a deterministic network consumes time and power to limited useful effect and only to the extent that the device battery can sustain a charge. In a dynamic scenario, the network nodes could spend all their time reconfiguring routes and never sending any useful messages.

In addition, the resources required for maintaining routes in deterministic networks are relatively high. This is generally not a problem for static devices embedded in a network where the cost of the resources and power can scale with the volume of messages to be routed. But for a small, battery-operated device, its resources and power consumed by its resources can carry a much higher relative cost premium. Also, many networks are configured such that each communication channel is one-to-one. This means that one node talks to only one other node in the network at a given instant. Further, even if the network nodes have multiple channels, they are still communicating separately with each adjacent node on each channel which requires multiple transmissions of any given message, one transmit per channel, per node, and in many cases with significant attendant protocol overheads.

Another category of networks includes mesh networks. Mesh networks generally do not inhibit or limit dynamic reshaping of a network's topology. Here, a mesh network is defined as a network of nodes that communicate with correspondent network nodes using only broadcast network messages without using an addressing scheme or routing protocols. As used in this disclosure "correspondent network node(s)" or "correspondent(s)" refers to a group of network nodes that are in direct communication with each other; that is, they are each in range of each other's broadcasts (also referred to as "neighbor(s)" or "adjacent" network nodes). Each of the network nodes may use mobile radios to communicate with its adjacent network nodes. The mobile radios may function as repeaters in the network without requiring manual configuration. As used herein a "broadcast" network message refers to a single network message that is simultaneously communicated to the multiple network nodes on a network. When network messages are broadcast from any given node, the messages can be received by each of its neighbor nodes, and each neighbor can be configured to rebroadcast each network message to its neighbors, and so on, until the network messages are propagated throughout the mesh network. Each network node includes a receiver and a transmitter, and each has the ability to go to sleep when not in use, thus producing energy savings.

The specific category of the mesh networks described above is a "flood fill" mesh network. Flood fill mesh networks also do not use predetermined routes. Flood fill mesh networks are characterized in that any given network node only knows information about, and communicates with, adjacent network nodes on the network. In one embodiment, the term "adjacent" network node means any network node within direct range of any given network node's radio. Network nodes in a flood fill mesh network only know information about their adjacent neighbor nodes and requires no other memory, network tracking, or routing tables. To create such a network, each network node may be in range of at least one other network node and regularly broadcasts to at least one other node on the network. Further, in flood fill mesh networks, each node does not know (or care) if any given network node is a destination node for a particular network message or if it is a node along one of the pathways to the destination node. In a flood fill mesh network, node names and addresses are not required, and if used, are not required to be unique. In addition, radio transmissions from network nodes are broadcast transmissions to any and all neighbors simultaneously which avoids redundant message transmissions to each individual neighbor.

One advantage of flood-fill mesh networks is that they work well with mobile networks because flood fill networks are transparent to changes in the physical locations of the network nodes at any and all times. If the flood filling operations are performed adequately, then whichever network node a particular message was destined for will eventually receive it. Thus, building routing tables for each change is redundant.

However, flood fill mesh networks also have a number of drawbacks including (i) message path duplication—all messages traverse all paths to ensure the intended recipient is found, resulting in bandwidth overloading (ii) message replication—each node rebroadcasts each message, which without mitigation can lead to an exponential message replication and network overload (e.g., nodes receiving messages they already sent out) and (iii) resource overloading—each message travels to each node on the network which can lead to network message density saturating the nodes. And while flood fill mesh networks do not require use of node addresses, each network node still needs to know when a message arrives that was destined for it.

Bluetooth Low Energy Mesh ("BLE Mesh") is a contemporary example of a flood fill mesh network. In order to mitigate some of these drawbacks, BLE Mesh networks use various techniques, including (i) restricting the size of each mesh frame (e.g., to 8 bytes) to avoid resource overloading (ii) defining globally unique node addresses for source/destination node pairing in the network and (iii) using a long integer message identifier (e.g., 32-bit serial number) that can be used to identify each unique message received to prevent message replication. The network messages are stored in a message cache wherein the long integer message identifiers (a.k.a. serial numbers) can be compared against those of newly received network messages to identify any messages that have already been received previously.

The long integer message identifiers can be combined with a separate message "time to live" ("TTL") value to help manage message longevity and the message cache size. BLE Mesh networks are configured to use the combined TTL value with the long serial number to uniquely identify messages in the network. Network messages can be configured to be deleted when the TTL count expires. The TTL value basically indicates that a message can only travel so many hops across the nodes in the network. By analyzing the serial number of each received message, a node in a BLE Mesh network can determine it has already received a particular message and can thereafter decide to drop the message.

The downside to BLE Mesh networks is that they require a rather large table (or other data structure) of serial numbers to be maintained at each network node which can lead to local resource issues. In addition, BLE Mesh networks have very low mesh bandwidth and overall throughput, and correspondingly high resource costs—e.g., they incur significant memory and power requirements in dealing with protocol overheads.

SUMMARY

Disclosed is an improved implementation of a flood fill mesh network that utilizes low power and does not require any network addressing or routing protocol for network message delivery. In at least certain embodiments, network messages are only communicated to a network node's correspondents using broadcast network messages over a wireless network. Network messages propagate throughout the network based on each correspondent node broadcasting and/or rebroadcasting received messages to its correspondent nodes until each message reaches its intended destination node. Coordinated synchronization across network nodes may be achieved by each network node broadcasting synchronization frames to its correspondents within a synchronization window time period and thereafter adjusting its own start time for the next synchronization period to converge synchronization. A guard band may also be utilized to account for any clock drift and signal path delays between any two communicating network nodes.

BRIEF DESCRIPTION OF THE DRAWINGS

The above aspects and other features of the innovative techniques described in this disclosure will become apparent to those skilled in the art upon review of the following description in conjunction with the accompanying figures, wherein.

DETAILED DESCRIPTION OF EMBODIMENTS

Throughout this description numerous details are set forth in order to provide a thorough understanding of the various embodiments described in this disclosure which are provided as illustrative examples so as to enable those of ordinary skill in the art to practice such embodiments. It will be apparent to those skilled in the art, however, that the techniques described in this disclosure may be practiced without some of these specific details; or in other instances, well-known structures and devices may be shown in block diagram form to avoid obscuring the principles and features described in this disclosure. The drawings and examples provided herein are not intended to limit the scope to any single embodiment, as other embodiments are possible. In addition, where certain elements or features may be partially or fully implemented using known components, in certain instances only those portions of such known components that are necessary for an understanding of the embodiments are described, and detailed descriptions of other portions omitted so as not to obscure the description of the salient aspects and features of the novel techniques disclosed herein. Moreover, the applicant does not intend for any term or phrase in the specification or claims to be ascribed any uncommon or special meaning unless expressly set forth in this disclosure.

A Mesh Radio Network Implementation

The techniques described in this disclosure pertain to systems and methods for implementing an improved flood fill mesh network that utilizes low power and does not require any network addressing or routing protocol for network message delivery. In one embodiment of the mesh protocol all communications among network nodes are message broadcasts. In at least certain embodiments, network messages are only communicated to a network node's correspondents via broadcast network frames. In such embodiments, the network nodes are configured to only broadcast, listen or sleep—there is no notion of one network node individually communicating with one other node. Network messages propagate throughout the wireless network based on each correspondent node in turn rebroadcasting its received messages to its correspondent nodes.

Coordinated synchronization across network nodes can be achieved by each network node broadcasting synchronization frames to its correspondent nodes within a synchronization window time period, and thereafter adjusting its own start time for the next synchronization period to converge synchronization of the network nodes communicating on the wireless network. A guard band may also be utilized to account for any clock drift and signal path delays between any two communicating network nodes.

Figure 1:
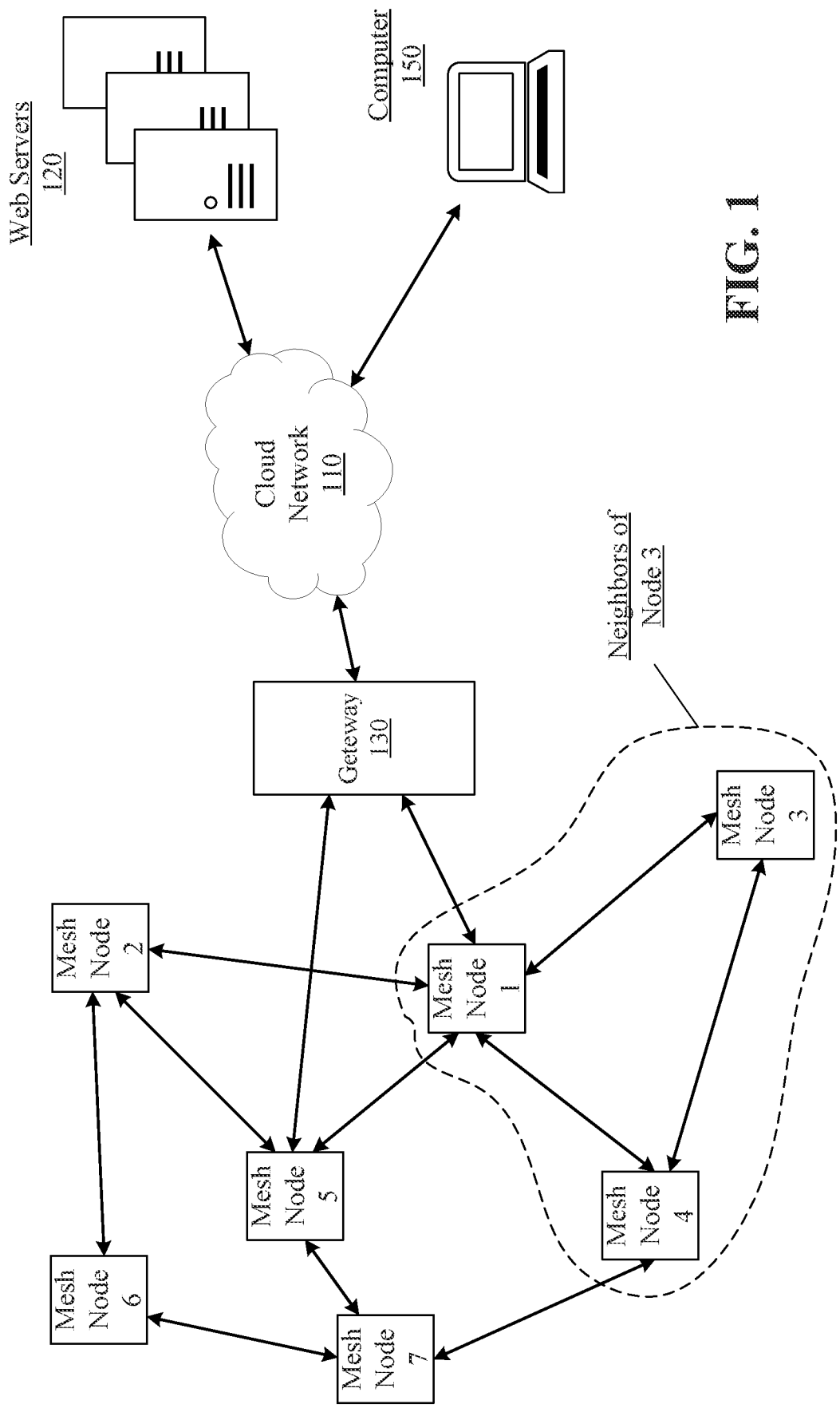
FIG. 1 depicts an overview block diagram of exemplary aspects of a wireless mesh network upon which the embodiments described in this disclosure may be implemented.

FIG. 1 depicts an overview block diagram of exemplary aspects of a wireless mesh network upon which the embodiments described in this disclosure may be implemented. In this configuration network communications can be passed between the web servers 120 and computer 150 and the various network mesh nodes 1 to 7 via a network gateway 130. Web servers 120 and computer 150 may communicate with and access data from any of the mesh nodes 1 to 7 via one or more wired or wireless cloud networks 110. Web servers 120 may include cloud-based web services such as Amazon Web Services (AWS) or Microsoft Azure. Each mesh node 1 to 7 communicates with its neighbors on the wireless mesh network. As shown, mesh node 3 in the diagram is in communication only with mesh node 1 and mesh node 4 that are node 3's neighbor nodes on the mesh network.

The network can be adapted for coordinated synchronization across network nodes. In at least certain aspects, this can be accomplished by each network node broadcasting synchronization frames to its neighbors listening on the network, and thereafter adjusting its own start time for the next synchronization period ("synchronization window") to account for any clock drift between itself and any adjacent broadcasting network nodes. Synchronization frames can be used to synchronize network nodes during the synchronization window, to indicate current mesh parameters and node state, to indicate the adjacent neighbors, and also to show network message frame receipts for network messages received. In one aspect the timing of the next synchronization window can be determined based on the receipt time of the synchronization frames received from the node's neighbors.

In order to avoid network message broadcast collisions on the network, the network message frame delivery methodology may be based on statistical probability mapped across the network with little or no network-wide node tracking or routing tables needed for message delivery. Broadcast collisions can be avoided based on configuring each network node to broadcast its synchronization frames at different times within the synchronization windows and to broadcast network messages at different times such that the probability of any two network nodes broadcasting a message frame/synchronization frame at the same moment within the same time window is substantially unlikely to occur. In a preferred embodiment, the synchronization frames may be broadcast at times selected randomly within the synchronization window. In a preferred embodiment, each node configures the timing of its own broadcasts, entirely independently of any other node or other influence, and prior to each synchronization window.

Further, the embodiments described in this disclosure are configured to reduce the resources and power required by conventional flood fill mesh networks (e.g., BLE Mesh). Network nodes can be configured to consume less power while maintaining synchronization with other network nodes. Each network node includes its own internal clock and may be configured to reduce power consumption by going into a sleep state for a certain percentage of time (e.g., 95% of the cycle time), and then waking up periodically to synchronize with other nodes on the network. In one embodiment the improved flood fill mesh radio network may be used in conjunction with sensor networks or various IoT applications.

Definitions

For purposes of this disclosure the following terms have a meaning with respect to the described methods and techniques as follows:

Listen window ("LW")—that period of time that nodes are awake and listening. The listen window is greater than or equal to, and fully encloses, the synchronization window.

Synchronization window ("SW")—that period of time that nodes are awake, communicating and listening for communications from other nodes in the network.

Guard Interval ("GI")—that period of time from the start of the listen window time to the start of the synchronization window time period.

Useful message—that part of a message that conveys useful information to the recipient and is not used in facilitating the transport of the message through the network.

Message Frame—a frame designed to convey a useful message.

Synchronization frame—frame designed to convey mesh synchronization and control information.

Synchronization Interval—the time between successive time periods in which the network nodes are scheduled to wake up and send and receive network frames.

Message overhead—all other message bits transmitted that are not defined as useful to the application, including any and all bits used for message management during message transport.

Useful Message Power—total power cost, per bit, of sending a useful message.

Neighbor Node—a network node, designated as such, based on proximity and/or link quality.

Neighbor Table—a table of neighboring network nodes determined to be proximate to a network node.

Message Receipt—indication that a particular message has been received which may also include the time the message was received or the age of the message in relation to other messages.

Message Receipt Table—a table of message receipts.

Forwarding Probability—the probability that any given message will be selected for rebroadcast by any given node.

Figure 2A:
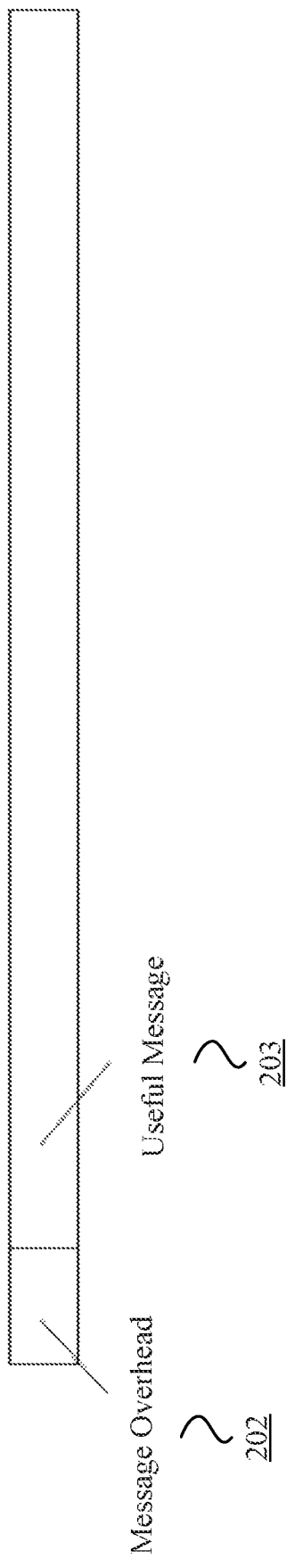
FIG. 2A depicts an example embodiment of a message format for a mesh network in accordance with the techniques described in this disclosure.

The notion of a useful message may be described as that part of a message that conveys useful information to the recipient but that is not used in facilitating the transport of the message. That is, all protocol and routing bits are not defined as useful even though they may be required for routing. Such bits are referred to as "message overhead" bits. FIG. 2A depicts an example embodiment of a message format for a mesh network in accordance with the techniques described in this disclosure. In the illustrated embodiment network message 200 includes a message frame 201 comprising message overhead bits 202, such as protocol and routing bits, and a message payload or useful message 203.

Synchronized Communications

Figure 2B:
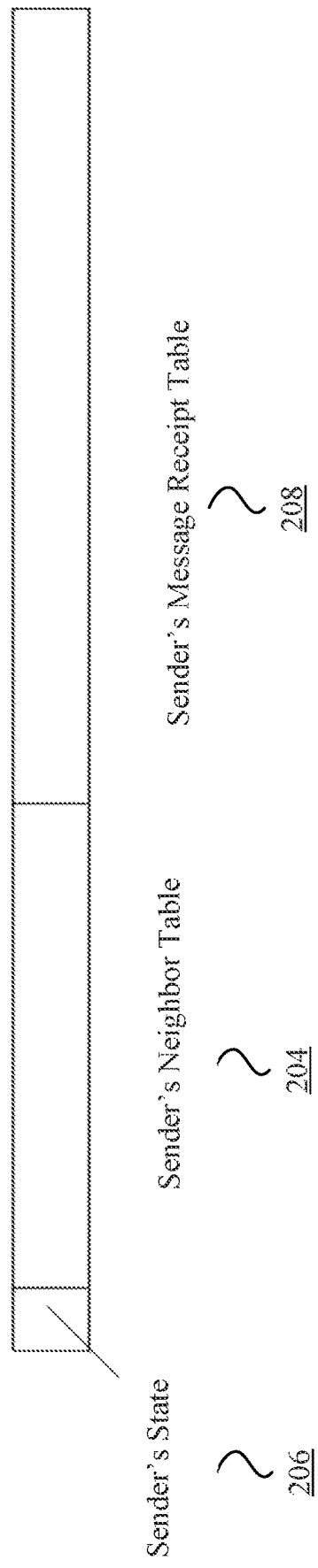
FIG. 2B depicts an example embodiment of a synchronization frame format for a mesh network in accordance with the techniques described in this disclosure.

It is important that synchronization of network node communications be coordinated among the nodes in the network. Synchronization allows nodes to power down between synchronization windows. Synchronization frames may be used for maintaining synchronization among neighboring nodes in communication over a mesh network. FIG. 2B depicts an example embodiment of a synchronization frame format for a mesh network in accordance with the techniques described in this disclosure. Synchronization frame 205 includes a frame type designator 206, a sender's neighbor table 204, and a sender's message receipt table 208. In some embodiments the sender's message receipt table 208 may be omitted.

Synchronized clocks internal to the network nodes (not shown) can be used to compensate for any frequency drift error between the internal clocks of two network nodes communicating on the network. It is well known that temperature is the primary factor in frequency drift error for clocks that utilize crystal oscillators/resonators or silicon-based microelectromechanical systems ("MEMS") oscillators/resonators. With frequency drift error, over time the internal clocks of any two network nodes will eventually move completely out of synchronization and no longer be able to communicate. It is possible to use low-cost, low-power oscillators/resonators for measuring short time intervals with sufficient accuracy. Low-frequency oscillators/resonators are suitable because current consumption can increase significantly with higher-frequency oscillators/resonators. Tuning-fork crystals, for example, typically have a lower frequency range of 10 kHz to 200 kHz in fundamental mode and a maximum drive level of 1 micro-watt ($\mu$W) which can make tuning-fork crystals a good choice for use as a low-power crystal oscillator in accordance with the techniques described in this disclosure. Software can additionally be used to reduce frequency drift error by correcting measured frequency values based on the manufacturer's calibration, for example. MEMS oscillators/resonators with low frequency drift (e.g., 5 ppm or less) can also be used in place of crystal oscillators/resonators with at least certain of the embodiments described in this disclosure.

Whether by using low-frequency crystal/MEMS oscillators/resonators, software techniques, or combinations thereof, it is possible to reduce frequency drift down to 5 ppm (parts per million) or less. A frequency drift of 5 ppm provides a worst-case frequency drift between any two clocks on the order of 5 milliseconds over an interval of 20 minutes. Therefore, the maximum frequency drift error between any two communicating network nodes on a synchronization interval of 20 minutes may be constrained to 10 milliseconds (double that of each individual node). By limiting the maximum radio sleep time to approximately 20 minutes, a maximum synchronization window divergence of only 10 milliseconds can arise in response to the clock drift error between two communicating network nodes, which can be easily mitigated in the mesh design using a guard interval, for example, as set forth in detail below.

Note that, in the preferred embodiment, network clocks are not synchronized. Instead, each node maintains its own, uncorrected, clock. The receipt of each synchronization frame provides each node with sufficient detail to determine when its own next listen window should be opened in relation solely to its own clock. Since each clock rate varies, each node may next wake at a slightly different time, but since each node resets its own listen window clock on each synchronization, the drift of each clock is only effective over the time between each listen window. This drift is then small over typically useful listen window intervals and the guard interval accommodates this drift while consuming negligible additional power as a percentage of the total power. The guard interval is a tuning parameter, and when set to zero, merely increases the probability of a lost message or synchronization frame. In a well-populated mesh, such losses may not be significant.

The network nodes on the mesh network can be adapted to broadcast synchronization frames 205 to their neighbor network nodes. In one embodiment each network node can be configured to broadcast one synchronization frame 205 for each synchronization interval. The synchronization frames 205 provide certain detailed information regarding the most recent message frames received from any given neighbor in the mesh network. Synchronization frames 205 may also include "state information" of a network node that can be communicated to the other nodes on the network. The state information may include timing information for network node synchronization and may also include a network node's neighbor table.

Providing the state information within synchronization frames 205 allows neighbor network nodes to (i) maintain basic information and coordinate message delivery among network nodes (ii) make rebroadcast decisions such that there is a reduction in overall message replication in the network, and/or (iii) improve network bandwidth by not forwarding network messages in cases where a message is statistically more likely to be forwarded by at least one of the node's neighbor nodes, and thus can be safely dropped. Network messages that are received can also be buffered in a pending message queue in memory and can be flagged in the pending message queue as having already been received by a particular network node (and therefore not worthy of rebroadcast). This determination can be based on statistical probability.

Also important is determining which nodes are neighboring nodes (what nodes can be heard on the network). This may be determined based on the node's proximity or based on the quality of the communications link between nodes. Accordingly, and in some cases, nodes may just ignore other nodes even though they may be able to hear their network traffic.

Example Processes

The following processes and/or techniques can be used with various aspects of the improved flood fill mesh radio network described in this disclosure. It is noted that the methods and processes described below are exemplary in nature and are provided for illustrative purposes, and not intended to limit the scope of the disclosure to any particular example embodiment. For instance, processes in accordance with some embodiments described in this disclosure may include or omit some or all of the operations described below, or may include operations in a different order than described. The particular processes described are not intended to be limited to any particular set of operations or order of operations exclusive of all other potentially intermediate operations or different ordering of the operations. In addition, the operations may be embodied in computer-executable code, which may be adapted to cause a general-purpose or special-purpose computer hardware to perform certain operations. In other instances, these operations may be performed by specific hardware components or hardwired circuitry, or by any combination of programmed computer components and customized computer hardware and/or circuitry.

In at least certain embodiments a process for implementing a mesh network at a network node comprising a mobile device that includes a processor, a memory, an internal clock, and a radio for communicating with a plurality of network nodes over a wireless radio network. Each network node on the wireless radio network may be configured to communicate only with its correspondent network nodes using broadcast network messages. Each network node may also be configured for rebroadcasting network messages it receives to its correspondent network nodes on the wireless radio network. In one set of features, the techniques described in this disclosure can perform these operations without requiring any addressing scheme (particularly a static addressing scheme) or network routing protocol.

In embodiments each network node may be adapted to perform operations including waking up at a scheduled wakeup time to synchronize communications with the network node's correspondent network nodes on the wireless radio network during a synchronization interval time period comprising an interval between successive time periods in which the network node is scheduled to wake up and initiating a timer delimiting a synchronization window for the network node. At a time before the synchronization window expires each network node may be further configured for broadcasting a first synchronization frame comprising state information of the network node to its correspondent network nodes, and receiving one or more second synchronization frames comprising state information from at least one correspondent network node.

In one aspect, the network node's state information includes information relating to a first time lapse (or delta) between the scheduled wakeup time and timing of broadcasting the first synchronization frame and the at least one correspondent network node's state information include information relating to a second time lapse (or delta) between the at least one correspondent network node's scheduled wakeup time and timing of broadcasting the second synchronization frame. In other aspects, the state information may include the scheduled wakeup times for the network node and its correspondent network nodes on the network. In yet other aspects the state information may include synchronization frame receipt times from qualified neighbors, in which case the next synchronization window may be based only on qualified neighbors' synchronization frame receipt times.

The process may further include (i) broadcasting a network message to the network node's correspondent network nodes on the wireless radio network (ii) determining the at least one correspondent network node's scheduled wakeup time based on the at least one correspondent network node's state information (iii) calculating a time difference between the network node's scheduled wakeup time and the at least one correspondent network node's scheduled wakeup time (iv) adjusting timing of the synchronization interval time period to account for the calculated time difference, (v) scheduling a next wakeup time for the network node to initiate a next synchronization interval time period based on the adjusted timing of the synchronization interval time period, and (vi) entering a sleep state until the next scheduled wakeup time for the network node.

In certain embodiments, adjusting the timing of the synchronization interval time period for the next synchronization interval includes dividing the calculated time difference by a factor of two and adjusting the timing of the synchronization interval time period for the network node by one-half of the calculated time difference. If the at least one correspondent network node's scheduled wakeup time occurs before the network node's scheduled wakeup time, adjusting the timing of the synchronization interval time period comprises subtracting one-half of the calculated time difference from the synchronization interval time period. But if the at least one correspondent network node's scheduled wakeup time occurs after the network node's scheduled wakeup time, adjusting the timing of the synchronization interval time period comprises adding one-half of the calculated time difference to the synchronization interval time period.

In embodiments, a guard interval may be provided to compensate for clock drift between network nodes communicating on the wireless radio network. The guard interval may be set equal to double the clock drift between network nodes. The synchronization window may begin upon expiration of the guard interval and may end upon expiration of the synchronization window.

In at least certain embodiments the timing of broadcasting synchronization frames and/or network messages may be distributed randomly within the synchronization window, the listening window, and/or the synchronization interval.

Figure 3A:
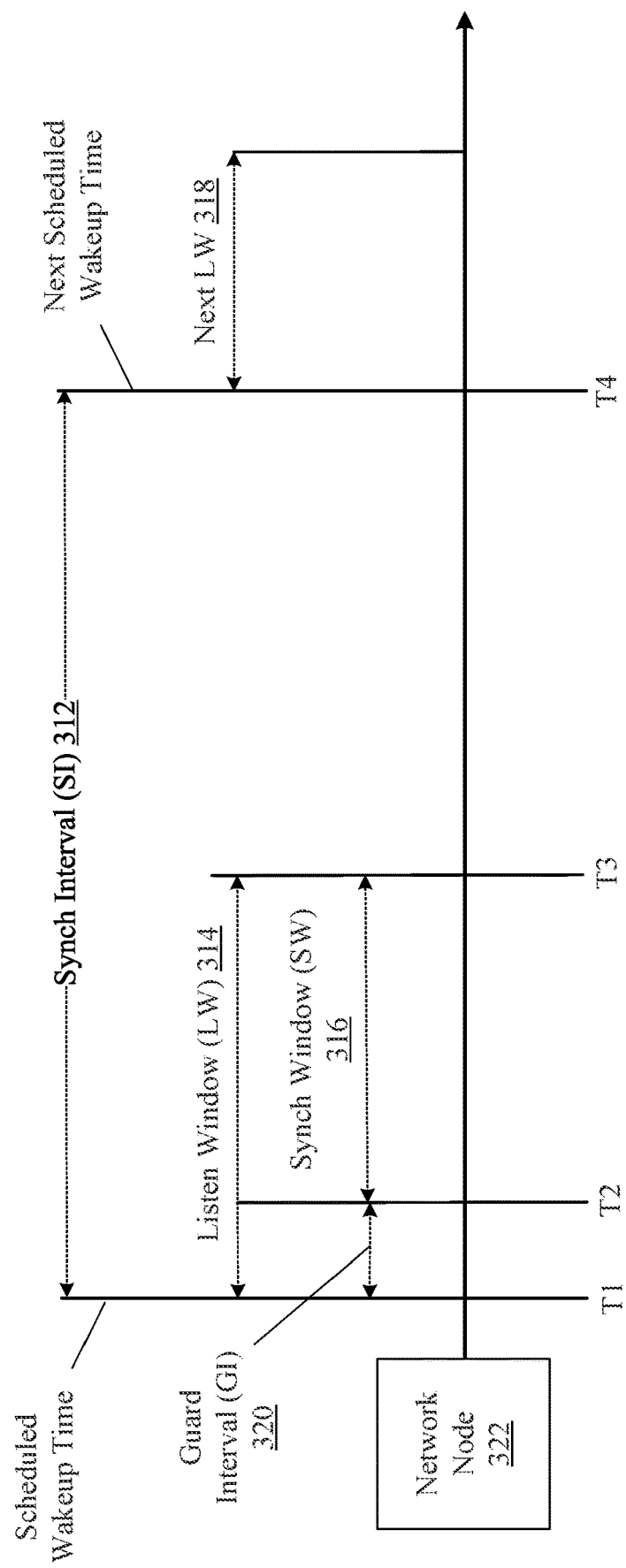
FIGS. 3A-3B depict conceptual timing diagrams of example embodiments of a process for synchronizing nodes in a mesh network in accordance with the techniques described in this disclosure.
Figure 3B:
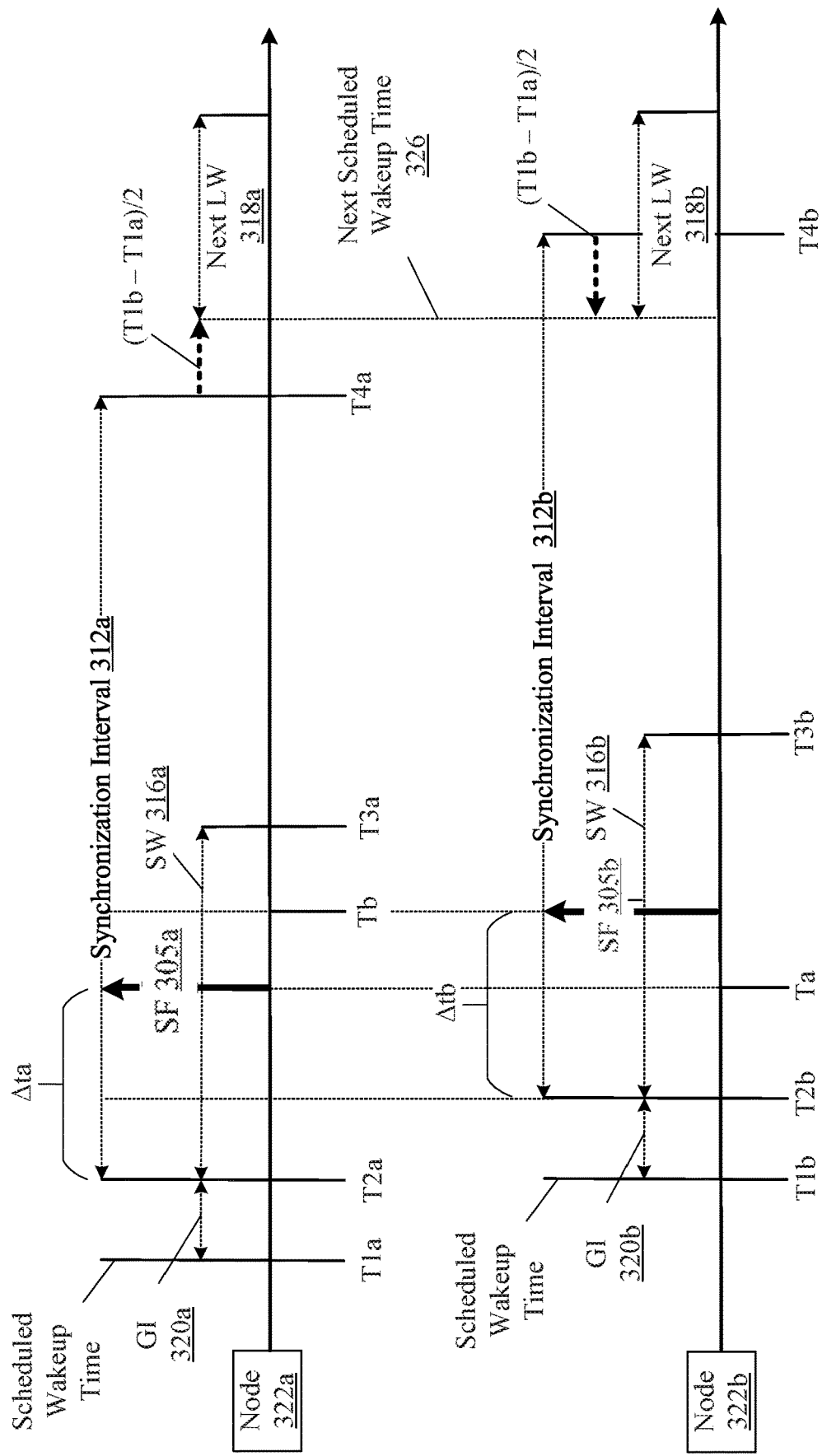

In one preferred embodiment there are no centrally generated clocks and each node derives its own synchronization time in relation to its neighbors for distributed time synchronization. FIGS. 3A-3B depict conceptual timing diagrams of example embodiments of a process for synchronizing nodes in a mesh network in accordance with the techniques described in this disclosure. In the illustrated embodiment of FIG. 3A the synchronization process 300 for network node 322 includes a synchronization interval 312, a listen window 314, a guard interval 320, a synchronization window 316, and a next synchronization window 318 representing a subsequent synchronization cycle. The synchronization interval 312 represents the time interval between successive periods in which the network nodes are scheduled to wake up and communicate. The radio does not need to listen all the time. When a network node is first turned on, it may listen for network traffic for the duration of the listen window 314 time period. The listen window 314 may be configured to have a duration that is long enough to ensure network nodes receive any network messages from their correspondent nodes that are already participating in synchronized communications on the network. If there are no correspondents in range, then a network node can simply start operating its own listen window 314 and synchronization window 316, and wait for the next participant to join in the communication on the network. But if there are network nodes already communicating on the network, a newly joining network node may simply synchronize with the existing group of correspondent nodes.

Synchronization frames 205 can be used to self-synchronize the nodes in the mesh network, as well as to synchronize each node with its neighbors. In at least certain embodiments the synchronization frames 205 may be configured to establish parameters for the listen window 314, for instance to facilitate acknowledging receipt of synchronization frames from correspondent nodes. Each correspondent node runs its own internal own clock and no two clocks are exactly the same. Synchronization frames may serve to inform correspondent nodes of the timing when its correspondents started their respective listen windows 314.

Each network node 322 can adjust its own start time for its next listen window 318 to account for any difference in timing between communicating nodes. In one embodiment the next listen window 318 can be set to an average value for the collective node clocks participating in a group of correspondent nodes (based on maximum clock drift between any two network nodes). These settings can change over time as the network and its traffic evolves.

Synchronization frames are important for timing because they include offset timing (delta) from the beginning of the synchronization window until the time a node communicates its synchronization frame onto the network. In certain aspects this information is included in the network node's state information loaded into the synchronization frames at transmission. Network nodes 322 may obtain this offset information from the synchronization frames received from their neighboring nodes, and calculate the time period for the synchronization interval 312 by relating the offset timing the network nodes receive from their correspondents with their own offset. And they may do so recursively each time a new synchronization frame is received. In at least certain aspects each network node can be configured to communicate one synchronization frame per synchronization window 316 to its neighboring nodes. In some cases the synchronization of the nodes communicating on the network may be configured to converge within two or three cycles.

Any synchronization frames 205 may be specified to arrive at times within the synchronization window 316 from time T2 to time T3. T2 refers to the time at which the synchronization window 316 commences for the network nodes 322 and T3 refers to the time at which the synchronization window 316 closes. T3 minus T2 therefore defines the synchronization window 316. Each neighbor node 322 can thereafter adjust its own start time for the next synchronization window (or next scheduled wakeup time T4) based on the synchronization frame in order to synchronize the nodes communicating on the network and to account for clock drift between any two network nodes.

In addition, because oscillators/resonators are only accurate within a certain bound, a guard interval 320 can be used to compensate for the temperature drift between internal clocks of nodes communicating on the network. In FIG. 3A the guard interval 320 is shown as the time interval between T1 and T2. T1 refers to the scheduled wakeup time for the network node and T2 refers to the time at which the synchronization window 316 commences at the end of the guard interval 320. A guard interval refers to a (relatively short) time interval to allow for a certain degree of frequency drift error (also referred to herein as clock drift or clock jitter) between the respective internal clocks of any two adjacent nodes communicating on the network. The guard interval 320 can be used by network nodes 322 to wake up and broadcast their respective synchronization frames before the start of the synchronization window 316 begins. In certain features the duration of the guard interval 320 may depend on the length of the synchronization window 316 and/or synchronization interval 312.

In one embodiment the guard interval 320 can be set to double the anticipated clock drift error between any two communicating nodes. This can be useful in worst cases where the frequency drift of the internal clock of one of the communicating network nodes is in the opposite direction as the frequency drift of the internal clock of the other communicating network node. Thus the guard interval 320 can be configured such that all other neighbor nodes 322 on the network are relatively certain to wake up within the guard interval (plus or minus). Doubling the frequency drift error ensures sufficient time for all nodes to wake up and broadcast their synchronization frames within the guard interval 320.

In reality, and depending on the number of neighbors, it is not a calamity if clock drift is more than the guard interval 320. Any given neighbor's synchronization frame only has a low probability of being broadcast at the start of the synchronization window and multiple neighbors provide multiple opportunities to resynchronize. For this reason, the guard interval 320 may be configurable and may be tuned as part of system development to best suit application circumstance.

A synchronization timer (not shown) can be set internally by each network node with a value between T2 and T3 to initiate its listen window 314. In one embodiment the listen window 314 can be configured to start before the synchronization window 316 by the duration of the guard interval 320 to compensate for the maximum anticipated clock drift between the internal clocks of any two communicating nodes. The duration of the listen window 314 can be set beforehand (e.g., predetermined) or it can be dynamically determined between communicating nodes over time. The listen window 314 may expand over time to alleviate collisions. It may also contract over time to reduce redundant listening time.

FIG. 3B depicts conceptual timing diagrams of an example embodiment of a process for synchronizing nodes in a mesh radio network in accordance with the techniques described in this disclosure. Each of the network nodes 322a and 322b communicating on the wireless mesh network according to embodiments described herein can adjust its own synchronization intervals 312 to synchronize with its correspondents on the mesh network. In the illustrated embodiment, network node 322a is shown to have a scheduled wakeup time at T1a and a synchronization interval 312a that expires at time T4a. T4a is the scheduled beginning of the next listen window cycle 118a. Network node 322b is shown to have a scheduled wakeup time at T1b and a synchronization interval 312b that expires at T4b. T4b is the scheduled beginning of the next listen window cycle 118b.

In operation at T1a, network node 322a wakes up and initiates its listen window timer (not shown). In at least certain embodiments this may also refer to a synchronization window timer or a guard interval timer, or any combination thereof. At some time lapse Δta after node 322a wakes up, a synchronization frame SF 305a is broadcast by node 322a to node 322b on the mesh network which is received at node 322b at time Ta. Note, any transmission delays due to network delays and signal quality have been ignored for purposes of this explanation, but persons of ordinary skill in the art would understand that network transmission delays would also be accounted for and addressed accordingly in a real-world design. Also note, synchronization frame SF 305a is communicated after the expiration of the guard interval 320a but before time T3a which is the end of node 322a's synchronization window 316a. Requiring network nodes to at least attempt to communicate their respective synchronization frames within the synchronization window 316 enables node synchronization while at the same time reduces power consumption.

At the time node 322a broadcasts its synchronization frame SF 305a, it may load its state information therein. In a preferred embodiment the state information may include the time difference between node 322a's scheduled wakeup time T1a and the timing of node 322a's broadcasting of its synchronization frame SF 305a at time Ta. Once the synchronization frame SF 305a is received by network node 322b, the time difference between node 322a's scheduled wakeup time 324a and the timing of node 322a's broadcasting of SF 305a (the time delta ta) can be extracted from the frame and used to calculate the duration of the synchronization interval 312b and to schedule the next wakeup time 326 for node 322b. In particular, from the state information extracted from SF 305a, node 322b can compare node 322a's scheduled wakeup time 324a with its own wakeup time 324b to determine the time difference T1b–T1a. In a preferred embodiment, this time difference T1b–T1a can then be divided by two and the resulting time used as the time period for adjusting node 322b's synchronization interval 312b.

As shown, if network node 322a's scheduled wakeup time occurs before network node 322b's scheduled wakeup time, then the timing of the synchronization interval time period 112a may be adjusted by network node 322a subtracting one-half of the calculated time difference T1b–T1a from its synchronization interval time period 312a and broadcasting at a time sooner by that amount for the next cycle. But if network node 322a's scheduled wakeup time occurs after network node 322b's scheduled wakeup time (not shown), then the timing of the synchronization interval time period 112a may be adjusted by network node 322a adding one-half of the calculated time difference T1b–T1a to its synchronization interval time period 112a.

Similarly, the process may be conducted for network node 322a except that the timing of the synchronization interval time period can be adjusted in the opposite direction as shown in the illustrated embodiment of FIG. 3B. The respective scheduled wakeup times for the network nodes can then be scheduled accordingly. The state information may also include node 322a's scheduled wakeup time in which case it can be extracted directly from the synchronization frame and used to calculate the duration of the synchronization interval 312b and to schedule the next wakeup time 326 for node 322b as above.

Likewise, when node 322b broadcasts its synchronization frame SF 305b, it may load its state information therein. Once the synchronization frame SF 305b is received by network node 322a the time difference between node 322b's scheduled wakeup time T1b and the timing of node 322b's broadcasting of its synchronization frame SF 305b (time delta tb) can be extracted from the frame and used to calculate the duration of its synchronization interval 312a and to schedule its next wakeup time 326 for node 322a as above. In this manner, the synchronization between nodes 322a and 322b may be configured to converge within two or three synchronization frames/cycles.

As an illustrative example, a receiving node ("RNode") may be configured to record the time it received a synchronization frame from a broadcasting node ("TNode") and to record the difference between the arrival time of the synchronization frame and the next planned listen window 314 start time. In certain embodiments this can be used by any RNode to derive the timing for the next synchronization cycle 318. When a new synchronization frame arrives the RNode can divide by two the difference in timing between the wakeup time of the RNode as determined by its own internal clock and the scheduled wakeup time of the TNode as determined from the TNode's state information in the synchronization frame and the receipt time of the synchronization frame.

In one embodiment the state information in the synchronization frame includes the time difference (delta) between the TNode's scheduled wakeup time and the time the TNode broadcasted its message onto the network. If a new synchronization frame is received, the RNode can determine the synchronization interval 312 based on comparing the TNode's state information in the synchronization frame with its receipt time. The RNode can then determine the time difference and then add (or subtract) the time difference to its synchronization interval to compute the next scheduled wakeup time for the RNode to initiate its next listen window 318 in the next synchronization cycle. This sequence can be performed recursively for each subsequent synchronization interval to synchronize clocks and to minimize clock jitter between the nodes communicating on the network. In embodiments, this methodology may be configured to converge within two or three synchronization frames 205.

When new network nodes 322 come along that do not know the synchronization interval 312, they can wait and listen with radio on for the duration of the listen window 314.

Minimize Power Consumption

In a network node the power cost of each useful message can be expressed as a number of watts (W) per bit of useful information. Thus, if it takes 1 W to broadcast a 100-bit useful message this is a power cost of $\frac{1}{100}$ watts per bit. There are a number of things that can affect the useful message power, including the physical design of the radio and antenna, the routing protocol overhead involved in delivering the useful message to the intended recipient, and the channel utilization for reaching multiple correspondent nodes. The two primary sources of power cost include the radio for transmitting and receiving network messages and the microcontroller for processing those network messages. For any given radio there are two principal ways to reduce the power cost of delivering a network message: by ensuring the radio is off for as much time as is possible and by reducing the routing protocol overhead required for network message delivery. When a radio is off, it is not listening for network traffic, and thus is not using any power during that period. But radios cannot receive transmissions from correspondents until power is restored. A fundamental problem with turning off the radio is knowing when to turn it back on again to send and receive new messages.

In line with this, taking a variation of 5 ppm as a typical or representative example maps to a clock variation of plus or minus 6 milliseconds over 20 minutes (20×60×1000=1, 200,000 milliseconds). Thus, when using a clock chip with a guard interval 320 of 6 milliseconds, the maximum time a node could be asleep and remain synchronized with its neighbors would be 20 minutes. In reverse, if the guard interval 320 is set to plus or minus 5 milliseconds, the synchronization interval 312 can be as long as approximately 18 minutes. This design technique can result in a sleep duty cycle of 99%, thus providing significant energy savings. The longer the synchronization interval 312 is constructed in relation to the synchronization window 316 and the guard interval 314, the more energy savings can be realized. The downside is a negative impact on data rate because network messages can only be communicated while network nodes are awake. But for many IoT applications, this is acceptable since sensors do not need to send and/or receive a constant stream of data to be used effectively. For instance, in a sensor network, one node may be measuring temperature, another air pressure, and a third air flow.

In aspects, each network node may include a pending message queue (not shown) and may be configured to broadcast network messages at the head of a pending message queue. The network node can thereafter move messages that have been broadcast to the tail of the pending message queue after transmission. Synchronization frames 205 and message frames 201 received from the correspondent network nodes can be loaded into the pending message queue. The synchronization frames from correspondent nodes can be used for determining the next listen window 118 start time and for updating the status of message frames 201 in the pending message queue.

Figure 4A:
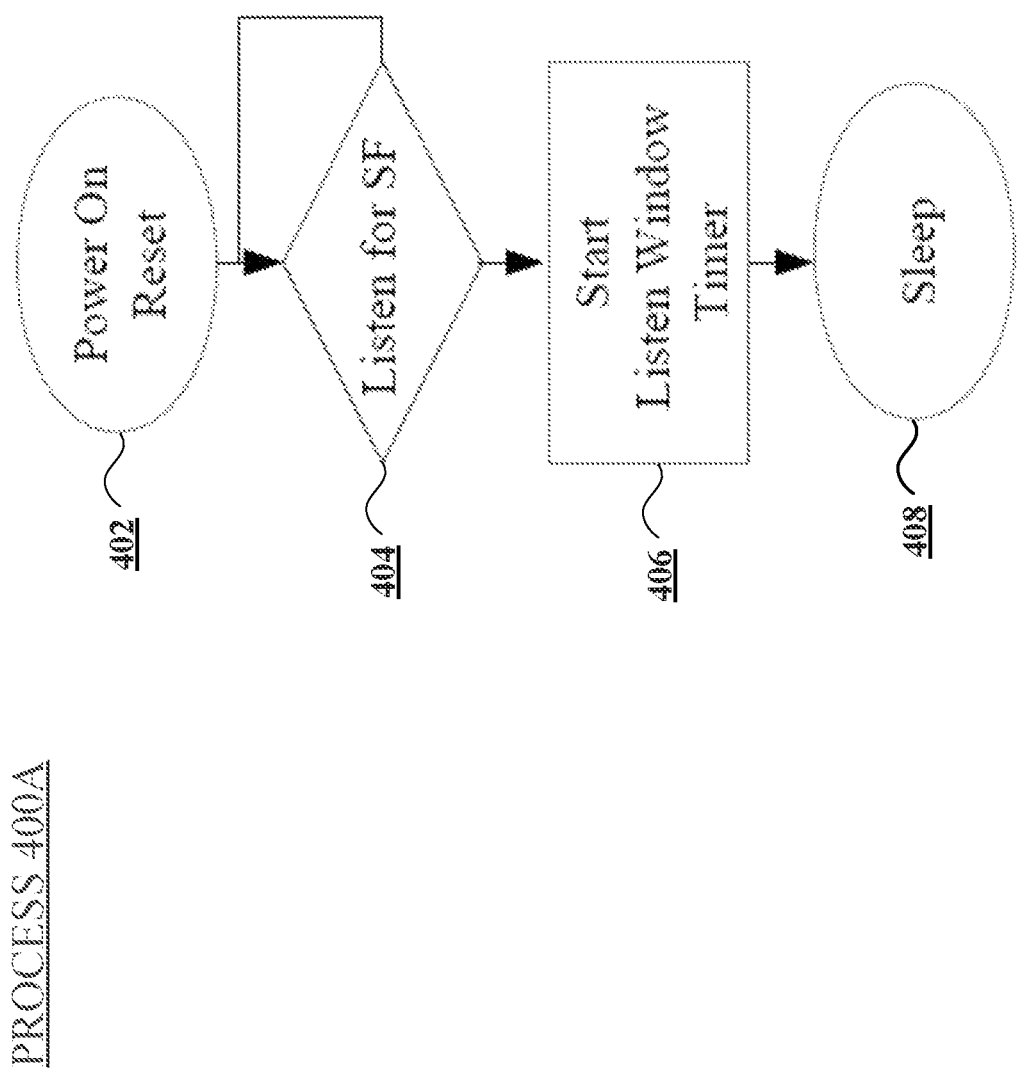
FIGS. 4A-4B depict flow charts of an example embodiment of a process for synchronizing network nodes in a mesh network in accordance with the techniques described in this disclosure.

FIG. 4A depicts a flow chart of an example embodiment of a process for synchronizing network nodes in a mesh network in accordance with the techniques described in this disclosure. In the illustrated embodiment, process 400A begins at operation 402 wherein a network node in the mesh network performs a power on (or reset) function. Then, at decision block 404 the network node begins listening for synchronization frames on the network. The network node also initiates a listen window timer at operation 406. In one embodiment, the listen window timer can be set simultaneously upon performing the power on function. If no synchronization frames are received during the listen window, the network node can repeat operation 404 until a synchronization frame is received or the listen window expires. If the listen window expires, the radio can go back into sleep mode until the start of the next listen window. When the listen window time period closes, the radio can power down (stop listening) and set a sleep timer for a power-off interval before the next cycle begins (operation 408).

The pending message queue for each network node can be scanned and any messages can be passed up the message receive stack. Any messages that have been seen before or marked as "received" can be deleted to prevent re-transmission. Additionally, any messages marked as timed out (optional only if TTL is used), can also be deleted. This completes process 400A according to one example embodiment of the techniques described in this disclosure.

Figure 4B:
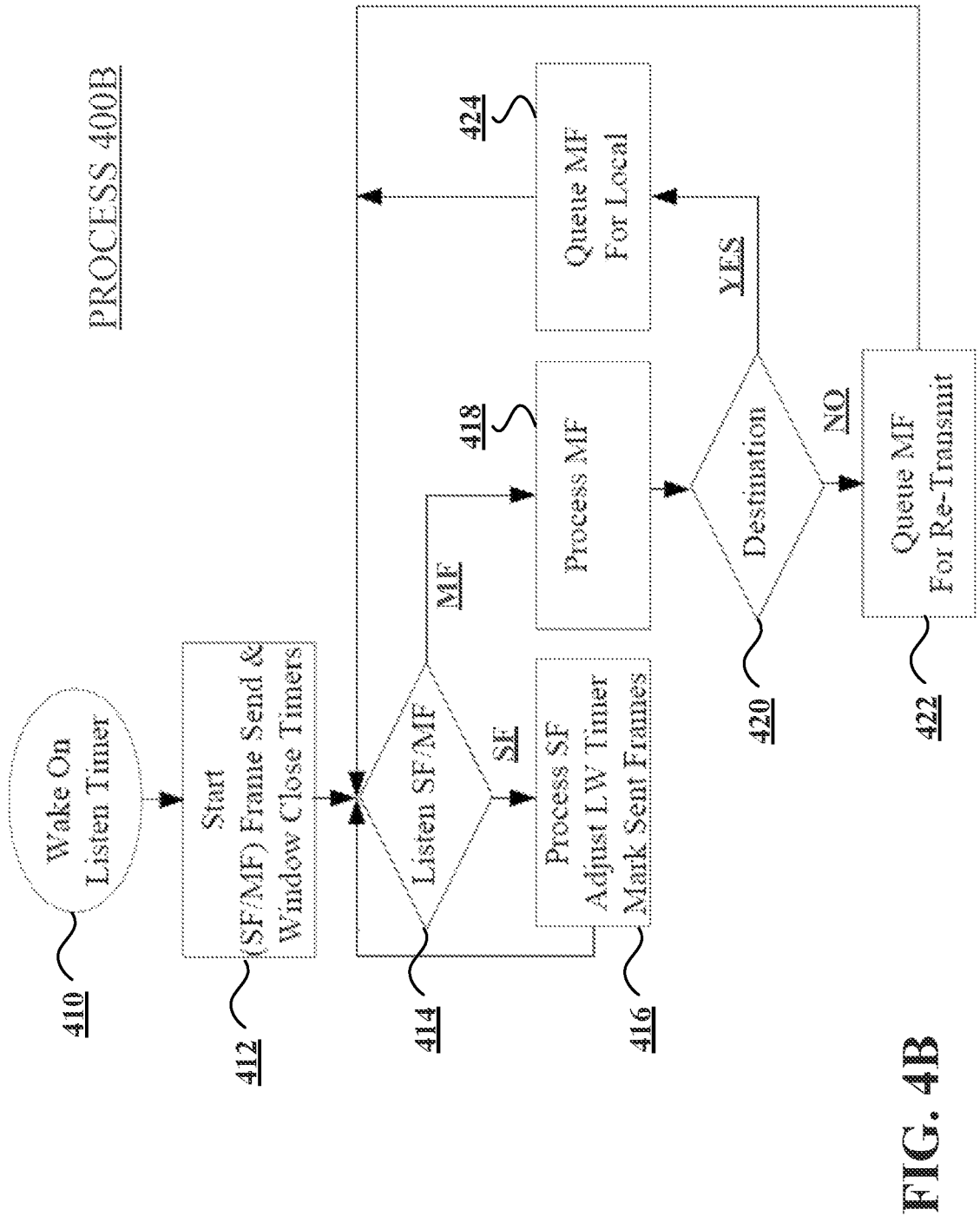

FIG. 4B depicts a flow chart of an example embodiment of a process for synchronizing network nodes in a mesh network in accordance with the techniques described in this disclosure. In the illustrated embodiment process 400B begins at operation 410 in which a network node in the mesh network wakes up upon the expiration of the previous synchronization interval. Network nodes can be configured to wake up according to a scheduled wakeup time. The network nodes can also set a timer to initiate the listen window. At operation 412, the network node can thereafter start broadcasting synchronization frames and message frames to its correspondent nodes. At decision block 414, the network node listens for any synchronization frames and message frames communicated from its correspondent nodes on the network. If a synchronization frame is received, at operation 416 it is processed, and the listen window timer is adjusted accordingly. Sent frames are also marked as such in operation 416. Process 400B then continues back to decision block 414 wherein the node listens for additional synchronization frames and message frames from its correspondent nodes and the process repeats until additional ones are received.

If a message frame is received, process 400B continues to operation 418 wherein the message frame is processed. At operation 420, the network node determines whether it is a destination node for the network message. If so, the message frame can be queued locally at operation 424 for processing and process 400B reverts back to decision block 414 in which the network node can continue listening for additional network traffic. But if not, process 400B continues to operation 422 wherein the message frame is queued for retransmission via rebroadcast message to its correspondents on the wireless mesh network. Process 400B reverts again back to decision block 414 and repeats as appropriate. This completes process 400B according to one example embodiment.

Each synchronization frame can provide a mechanism to ensure that the message has been received by other nodes and that it does not stay in circulation longer than necessary (which can be predetermined or dynamic). Synchronization frames can be configured to provide the details of the most recent frames seen by any given node. This information can be used to mark messages in neighbors' pending message queues as 'seen' and not worthy of re-transmission. In one preferred embodiment, probability can be used to determine if a sufficient number of remote nodes have seen a given message. If the number of neighbors that have seen a message is greater than some number of the nodes that are currently visible on the network, the receiving node may delete the message on the basis that using the same algorithm at each correspondent node will result in a high probability the message can be expected to propagate from one or more neighbors to all network nodes that have not yet seen the message.

The synchronization frames can also provide a mechanism by which the broadcast of a single message from a forwarding node is simultaneously received and acknowledged by all receiving nodes without any additional protocol transmission costs other than the single window synchronization frame.

RF Collisions

Nodes are constantly listening, and when nothing comes in, they can transmit. But even under this paradigm, network messages may still collide if a neighboring node is broadcasting over the same channel at the same time. A RNode may thus not receive a particular message because it collided with a message the RNode was broadcasting at the time. Conventionally, in such cases the RNode would wait and "back off" until it received the message, and then the RNode would attempt to broadcast its message frame again. Carrier sense multiple access with collision avoidance ("CSMA/CA") is a well-established technique used to listen for radio frequency ("RF") carriers just prior to broadcasting a frame and then back off for an interval before trying again. This is a proven technique for handling collisions. But one of the effects of using a synchronized broadcast window is that all the communications that would have happened over an extended interval are now compressed into a much shorter synchronization interval, significantly increasing communications density. This combined with the increased traffic required to communicate other messages besides a network node's own message frames can result in network traffic density easily exceeding the ability of standard CSMA/CA mechanisms to cope.

In addition, the RNode can keep this process going in a recursive loop until the message can be communicated over the network which can burn a lot of power and is completely non-deterministic. There's also the hidden node problem—when nodes cannot handle more than one message at a time, so if two separate nodes broadcast a message to a third node, the messages can experience a collision regardless of instituting any back-off protocol. In at least certain embodiments, since there is no single arbiter of the synchronization window or individual node transmission times, each node can individually communicate its message frames at different times within a broadcast window. In a preferred embodiment, each node may use random numbers to decide when to broadcast during a broadcast window as discussed previously.

The synchronized communications techniques described herein can be adapted to include broadcast interval randomization. Because frames are broadcast to all correspondent nodes, in a well-balanced mesh network there is a high probability that any collision involves a frame that has already been communicated via a different node. Instead of retrying the current transmission, it can simply be terminated and re-queued to be broadcast later in the same synchronization window or the next window. This provides a very simple, and deterministic, method for relinquishing the channel in the face of collision. Any collision in one synchronization window is unlikely to be a collision in a subsequent synchronization window.

The described techniques embrace the fact that collisions occur at times and will need to be dealt with. Probability can also be used for solving the collisions problem. In one aspect, the synchronization frame broadcast time can also be distributed randomly within the synchronization window for both the nodes communicating on the network. The synchronization frames from a particular node can therefore be communicated at any time in a random scatter of probabilities for synchronized transmission. With this feature each pair of communicating nodes can be adapted to broadcast synchronization frames randomly within the synchronization window. While collisions may still occur, the probability of collisions is substantially reduced because it would require two adjacent nodes to be broadcasting at exactly the same randomly selected time within the synchronization window, which is substantially unlikely.

In at least one embodiment, the same randomness can be used not only for communicating the synchronization frames but also for communicating the network messages as well. Useful messages can be broadcast randomly in the same manner as randomly broadcasting the synchronization frames during the synchronization window as described previously.

In other aspects nodes can detect a collision and (i) determine it doesn't care it collided and just communicate the message again on the next synchronization interval, or (ii) reschedule another random time to rebroadcast in the current window—i.e. rebroadcast the message again randomly or wait until the next synchronization window and broadcast it randomly again. Nodes can broadcast one random message, two messages, or any number of random messages within each synchronization and/or useful message window. The message time is not the same but moves around from one frame to the next, which makes it significantly unlikely there will be a collision.

In practice however this limitation is not generally significant for the types of applications for which this mesh network is best suited. As mentioned, the majority of messages have multiple paths and the probability of requiring a rebroadcast is low. However, where deemed necessary, it is possible to reschedule a second synchronization frame within any remaining synchronization window time period to expedite the communication of certain priority or new messages.

Message Removal

In one embodiment, messages are not queued or rebroadcast; they are for local node (nodes in range) consumption only. Received data messages fall into two categories (i) messages destined for the receiver and (ii) messages destined for another node. Any messages destined for the receiver are handled by the receiver. When the receiver is done with them, they are either returned to the message free list for reuse, or, if the message is a broadcast message, queued for rebroadcast (forwarding). For messages destined for another node, any messages that are not addressed to the node are queued for forwarding. Messages queued for forwarding may be scheduled to be sent at a randomly allocated time slot during the next synchronization window.

After a message is broadcast, it may be discarded. In one aspect, each message is broadcast (or rebroadcast) by each network node only once. In such cases, duplicate message transmissions occur only because multiple nodes may forward the same message.

Probability Forwarding

Messages waiting for forwarding in the pending messages queue may be arbitrarily removed from the message queue by the method of probabilistic frame rebroadcast reduction referred to herein as "probability forwarding". This process determines the need for message rebroadcast based on the number of neighbor nodes within range. Any set of network nodes within range of each other can choose to rebroadcast a randomly selected subset of the pending message queue. In one embodiment, the rebroadcast subset size may be inversely proportional to the number of neighbors. This can improve network bandwidth efficiency by reducing the number of redundant broadcasts and resource requirements and by limiting the number of neighbors.

Nodes may be configured to maintain a table of their immediate neighbors (correspondents) which need only contain the set of "N" nearest neighbors ordered by signal strength or quality (where N is generally less than all possible neighbors). In one embodiment, a sender node's neighbor table 204 enables it to determine whether or not to drop network messages sooner. For example, referring back to FIG. 1, if mesh node 2 and mesh node 5 are found to be in mesh node 1's neighbor table 204, then the destination node 3 receiving mesh node 1's synchronization frame 205 can determine that mesh node 1 and mesh node 5 are neighbors and that mesh node 1 and mesh node 2 are neighbors. Thus, when a synchronization frame 205 comes along containing a list of network messages that have already been received by a network node, they can be recorded as already seen. For example, if mesh node 1 sees mesh node 4's synchronization frame 205 that tells node 1 that a message destined for node 3 has already been delivered to node 3 by node 4, then node 1 does not need to communicate that same message since node 3 already has it. If node 1 knows node 3 has it, then node 1 can decide whether to rebroadcast the message again or to drop it. Such decision depends on the loop topology of the network and the number of network nodes.

As soon as a sufficient number of network nodes have a particular message, then the question arises whether the message needs to be rebroadcast at all or dropped. This can be determined statistically, i.e., based on the probability that broadcasting the message will be required for the message to arrive at its intended destination mesh node 3 when the message may also proceed to the destination node 3 via at least one neighboring node such as mesh node 4. For example, if there are two nodes that have a particular message in the mesh network, then it may not work so well to drop the message. But if there are five nodes that have the message, then the probability becomes much higher that at least one of the nodes will forward the message to its intended destination.

The more network nodes with the message locally, the greater the chance the message gets relayed to its destination. As long as any TTL expiration is set far enough in the future, chances are good that the message will be relayed to its intended destination node by at least one of the other neighboring nodes. Whereas this technique introduces risk that any given message may fail to be delivered to its intended destination, it works well in many applications. For example in sensor networks because every data transmission is not necessarily needed for the network to be used effectively. Where reliable transport is a requirement, higher network layers can be used as is well defined in the literature.

When flood filling a network of highly mobile nodes to reach a specific node, there is no prior knowledge of the network topology that can be used to optimize delivery. In dynamic topologies, routing communications are typically redundant before they can be effectively used, and deriving any static route information adds overhead to little or no advantage. Thus, in flood fill mesh networks topology information cannot generally be known beforehand. However, it is possible to improve the flood fill technique for dynamic topologies by allowing any given node to decide not to forward certain messages.

Nodes in a mobile mesh network have a dynamic topology wherein sometimes they can be located in a densely populated region of the network and sometimes they can be on their own or within range of only one or a few other network nodes. In the circumstance where a node is in the middle of a densely populated part of the network, it is not necessary for every node to forward every message. It is only necessary for a sufficient number of the nodes to forward a sufficient number of messages such that all, or nearly all, messages are forwarded (in any given synchronization window).

Accordingly, the embodiments described herein include innovative techniques whereby each network node may be configured to determine the probability of a message broadcast (broadcast probability) to be inversely proportional to the number of network nodes it corresponds with (neighbor count). The exact nature of the relationship between the broadcast probability and neighbor count is immaterial except to say that one neighbor should always dictate broadcast probability of 1, and the worst case where a node maintains a broadcast probability of 1 regardless of neighbors is simply the normal flood fill algorithm case. The broadcast probability in relation to neighbor count can be determined in any practical way, for example, by assessing the incoming message rate and throttling the rebroadcast rate accordingly. In another instantiation the relationship may be determined by a probability scaled to the number of neighbors and/or the incoming message rate, message priority, or some combination thereof. When using a broadcast probability proportional to a neighbor count, the nodes may tend to self-balance the network traffic and the message load can be dynamically and randomly distributed between network nodes.

Each node may also choose to maintain a heatmap of neighboring nodes and source nodes. Such heatmap may provide the probability that any given neighbor will lead to a pathway to a given intended recipient. This heatmap may be built by tracking which neighbor was responsible for delivering messages sourced by the recipient. Nodes can then use this mapping to determine if a message destined for the recipient has already been received by a neighbor (via the message receipt table 208) and to provide the corresponding probability that the message will be dropped when this neighbor has already seen it.

By using probabilities that can increase or decrease with changing conditions, the mesh network can dynamically bias its rebroadcast probability in favor of certain nodes in the face of dynamic topologies as well as stale heatmap information. While this alone can improve channel efficiency by reducing traveled paths, it is relatively resource hungry and does not scale well, requiring a node table the size of the network in addition to a simple table of immediate neighbors. However, these drawbacks may be mitigated by maintaining a cache of 'hot nodes', which may be advantageous over storing large routing tables in deterministic networks. The node itself keeps its hot list and determines whether or not it is going to favor a particular node, and this can evolve over time as the network adapts to network traffic. In the event that the path to a hot node becomes compromised or stale, other neighbors can become preferred as messages sourced by the hot node begin to arrive preferentially from other nodes. The broadcast nature of message communications and the use of dynamic discard probabilities ensures that other nodes have the opportunity to pass along any messages destined for a hot node in the case where any specific network node can no longer be reached by the preferred path.

In addition, network nodes have the option to remain on at all times. Another way of doing this would be if not every node needs to turn off. Some nodes could be left powered-up and listening the entire time. This would typically be used where the node has access to a continuous power source. In all other respects, powered nodes are the same as non-powered nodes. Non-powered nodes can wake up and broadcast a synchronization frame and the powered node(s), once a network message is received, can broadcast a network message providing the mesh details, including synchronization interval. This enables improvement in query response for those nodes such that any newly joining node can communicate a query frame at any time and then listen for a broadcast frame containing the current mesh synchronization details. This can reduce the power requirements for joining a mesh. This can also allow for the use of unsynchronized (or pop-up) nodes that simply turn on, broadcast some messages, and then go back to sleep. Such messages can be picked up by any always-on node in the network and delivered via the normal mesh process.

Forwarding probability may vary from 100 percent when only in range of one other node and may decrease according to a table of values indexed by the number of neighbor nodes. Such table of proportional values may be set/varied by the particular application. Probability forwarding may be further optimized by the use of "seen" frame information shared by the nodes. The number of neighbors that have already seen a given message increases the probability that the message will be deleted from the forwarding queue. If a number of neighbors have already seen a message, the probability is higher that a node that has not already seen it will see it having been sent from another node. Thus the probability that any given node forwards it can be lower (but never zero).

In another embodiment, forwarding probability decisions may be inversely biased by the number of neighbors a node has and the relationship of the network nodes with each other, as determined by each node. Having only one neighbor dictates 100 percent forwarding probability and having 20 neighbors dictates a lower probability. In one embodiment, the specific probability may be determined to be such that the sum of the probabilities of each network node forwarding a given message is at least 100 percent across connected neighbors. To achieve this each node calculates its view of each of its neighbors' probability for each message and ensures that the balance adds up to at least 100 percent when including the node's own forwarding probability for that same message.

Thus knowing if a given node has received a specific message significantly improves the resolution of probability forwarding. Such forwarding probability value derived may be further biased by neighbors reported communication signal or link quality. If overall signal integrity quality is high, the probability of successful transmission is high and the need for message forwarding may be correspondingly lower.

Duplicate Frames

Each node includes a mechanism to detect incoming messages it has seen previously to prevent unnecessary propagation of repeated messages. To achieve this, in at least certain embodiments, each node can be adapted to calculate and store (e.g., in local memory) an identifier such as a hash value. In one embodiment, a Pearson Hash value can be calculated for the message frames. A Pearson Hash has the property that the hash value is very sensitive to small changes in the message content. In addition, each broadcast message can be provided with a counter of some that can be incremented whenever a new message is originated. The counter can be configured to wrap relatively quickly (by providing a sufficiently small counter, e.g., 8-bit sequence of values from 0 to 256). Thus, even if a message remains the same over an extended period, the short counter will be changing and causing a change in the Pearson Hash value for that message. The size of the counter (and hence the value it counts to) should be large enough such that no two messages from the same node will remain in circulation throughout the mesh network for a time longer than it takes for the message's counter to wrap. In one aspect, this can be determined based on the originating node's message generation rate. As a result, in at least certain embodiments the network node address, the counter value associated with the network message, and a hash value (calculated by performing a Pearson Hash function on the message contents and the counter value) constitute enough information to sufficiently determine whether a network message has been previously communicated. Arriving network messages that are the same age or older than the most recently received message can be dropped by nodes as redundant.

Addressing

The techniques described herein do not require statically assigned addresses. But "ephemeral" addresses, or node identifiers, may be used for the network nodes. Ephemeral addresses are defined by each node, each time it is added to the network (via separate address resolution protocol). Applications can use any unique name to identify a given node via the device naming protocol. Such techniques include a process whereby each node may randomly assign itself an N-bit ephemeral address and broadcast an address resolution message to correspondent nodes. If the address is resolved within the mesh, then the address is already taken, and the node randomly assigns itself a new address. This cycle continues until the joining node has a unique address. This ephemeral address technique is only good for the particular mesh and may not persist across multiple mesh networks. The ability to create and utilize an ephemeral address is an important simplification that significantly eases the burden of node configuration and address management. One feature includes the ability to track specific nodes using ephemeral addresses.

Summary of Synchronized Communications

These methods together provide the ability to successfully flood-fill a mesh network of nodes with (i) reduced power (radio traffic can be off for significant percentage of time and radio duty cycles of <0.1% are typical; protocol overheads are <4% per 128 byte frame) (ii) reduced resource requirements (memory requirements persist only as long as it takes to move a message out of a node's immediate RF region, and (iii) reduced channel utilization (the ability of the radio to allow frames to be broadcast with reduced frame rebroadcasts and to reduce useful message replication at the recipient node with minimal overhead).

Example Systems

Provided in this present disclosure is a description of an example system for implementing the improved flood fill mesh radio network as set forth in this disclosure. Although certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner.

In addition, hardwired circuitry may be used independently or in combination with software instructions to implement the techniques described in this disclosure. The embodiments are not limited to any specific combination of hardware or software. The described functionality may be performed by custom hardware components containing hardwired logic for performing operations, by general-purpose computer hardware containing a memory having stored thereon programmed instructions for performing operations, or by any combination of computer hardware and programmed components. The embodiments may also be practiced in distributed computing environments, such as in a private or public cloud network, where operations may be performed by remote data processing devices or systems that are in communication with one another using one or more wired or wireless networks.

In at least certain embodiments the system includes mobile device configured for implementing a network node in a mesh network. The mobile device may include a processor, memory, internal clock, and a network interface for communicating over one or more wired or wireless computer networks. The mobile device may also include a radio for communicating with a plurality of network nodes over a wireless radio network. Each network node on the wireless radio network may be configured to communicate only with its correspondent network nodes using broadcast network messages. Each network node may be configured for rebroadcasting network messages it receives to its correspondent network nodes on the wireless radio network. In one embodiment, this can be performed without requiring any addressing scheme or network routing protocol.

The mobile communication device may be configured as a network node adapted for performing operations over the wireless radio network. Each network node may be adapted to perform operations including waking up at a scheduled wakeup time to synchronize communications with the network node's correspondent network nodes on the wireless radio network during a synchronization interval time period comprising an interval between successive time periods in which the network node is scheduled to wake up and initiating a timer delimiting a synchronization window for the network node. At a time before the synchronization window expires each network node may be further configured for broadcasting a first synchronization frame comprising state information of the network node to its correspondent network nodes, and receiving one or more second synchronization frames comprising state information from at least one correspondent network node.

In one aspect, the network node's state information includes information relating to a first time lapse (or delta) between the scheduled wakeup time and timing of broadcasting the first synchronization frame and the at least one correspondent network node's state information include information relating to a second time lapse (or delta) between the at least one correspondent network node's scheduled wakeup time and timing of broadcasting the second synchronization frame. In other aspects, the state information may only include the scheduled wakeup times for the network node and its correspondent network nodes on the network.

The system may further be configured to perform operations, including (i) broadcasting a network message to the network node's correspondent network nodes on the wireless radio network (ii) determining the at least one correspondent network node's scheduled wakeup time based on the at least one correspondent network node's state information (iii) calculating a time difference between the network node's scheduled wakeup time and the at least one correspondent network node's scheduled wakeup time (iv) adjusting timing of the synchronization interval time period to account for the calculated time difference, (v) scheduling a next wakeup time for the network node to initiate a next synchronization interval time period based on the adjusted timing of the synchronization interval time period, and (vi) entering a sleep state until the next scheduled wakeup time for the network node.

In certain embodiments, adjusting the timing of the synchronization interval time period for the next synchronization interval includes dividing the calculated time difference by a factor of two and adjusting the timing of the synchronization interval time period for the network node by one-half of the calculated time difference. If the at least one correspondent network node's scheduled wakeup time occurs before the network node's scheduled wakeup time, adjusting the timing of the synchronization interval time period comprises subtracting one-half of the calculated time difference from the synchronization interval time period. But if the at least one correspondent network node's scheduled wakeup time occurs after the network node's scheduled wakeup time, adjusting the timing of the synchronization interval time period comprises adding one-half of the calculated time difference to the synchronization interval time period.

In embodiments, a guard interval may be provided to compensate for clock drift between network nodes communicating on the wireless radio network. The guard interval may be set equal to double the clock drift between network nodes. The synchronization window may begin upon expiration of the guard interval and may end upon expiration of the synchronization window.

In at least certain embodiments the timing of broadcasting synchronization frames and/or network messages may be distributed randomly within the synchronization window, the listening window, and/or the synchronization interval.

Figure 5:
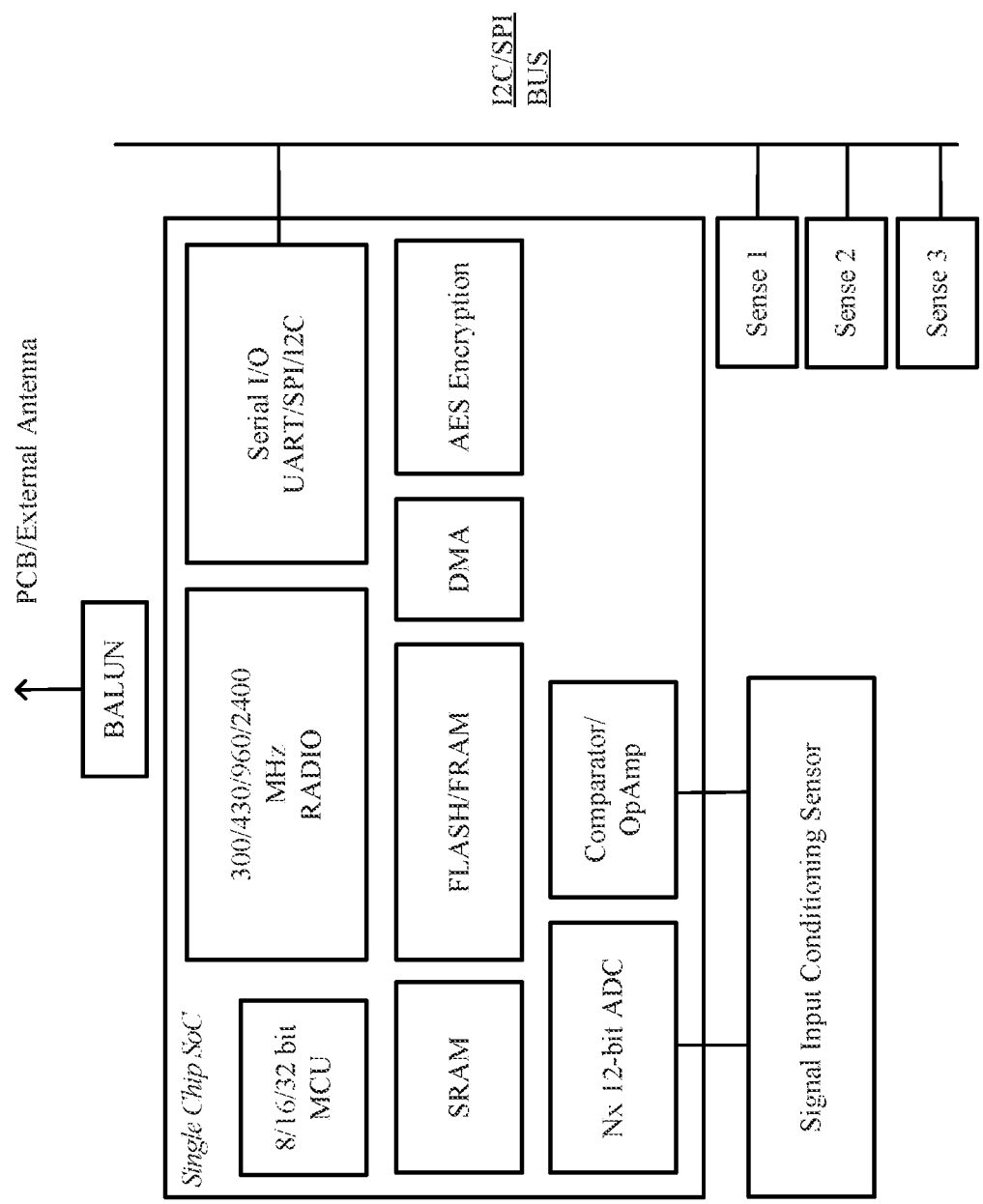
FIG. 5 depicts an example overview block diagram of a typical node radio system upon which the embodiments described in this disclosure may be implemented.

FIG. 5 depicts an example overview block diagram of a typical node radio system upon which the embodiments described in this disclosure may be implemented. Notwithstanding, embodiments of the present disclosure may be practiced using various computer systems including handheld devices, microprocessor systems, programmable electronics, laptops, tablets and the like. The embodiments can also be practiced in distributed computing environments where tasks are performed by remote processing devices that are linked through one or more wire-based or wireless networks. A hardware and/or software module may be implemented mechanically, electronically, or any suitable combination thereof. Computer hardware may include dedicated circuitry or logic that is permanently configured to perform certain operations. For example, a hardware module may be a special-purpose processor, such as a Field Programmable Gate Array ("FPGA") or an Application Specific Integrated Circuit ("ASIC"), Programmable Logic Device ("PLD"), etc. Computer hardware module may also include programmable logic or circuitry that is temporarily configured by software to perform operations. For example, computer hardware may include software executed by a general-purpose processor or other programmable processor. Once configured by such software, hardware modules may become specific machines (or specific components of a machine) tailored to perform one or more configured functions.

It will be appreciated by persons of skill in the art that the decision to implement a hardware module mechanically in dedicated and permanently configured circuitry or in temporarily configured circuitry (e.g., configured by software) may be driven by cost and time considerations. Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain of the operations described in this disclosure. Similarly, the functions described in this disclosure may be at least partially processor implemented, with a particular processor or processors being an example of computer hardware. For example, at least some of the operations described herein may be performed by one or more processors or processor-implemented hardware modules. Moreover, the one or more processors may also operate to support performance of the relevant operations in a cloud computing environment or as software as a service ("SaaS"). In addition, at least some of the operations may be performed by a group of computers (as examples of machines including processors), with these operations being accessible via a network (e.g., the Internet) and via one or more appropriate interfaces, e.g., an application programming interface ("API").

Although illustrative embodiments have been described herein with reference to the accompanying drawings, it is to be understood that the present invention is not limited to those precise embodiments, and that various other changes and modifications may be affected therein by one skilled in the art without departing from the scope or spirit of the invention.

What is claimed is:

1. A method for implementing a mesh network comprising:

configuring a network node of a plurality of network nodes in a wireless radio network to wake up at a first scheduled wakeup time to synchronize communications with neighbor network nodes during a synchronization interval time period comprising an interval between successive time periods in which the network node is scheduled to wake up, wherein the network node includes a processor and a memory and is configured to communicate with the neighbor network nodes in the plurality of network nodes;

at a time before a synchronization window expires, receiving a second synchronization frame comprising second state information broadcast from a neighbor network node, the second state information including a second time lapse between a second scheduled wakeup time for the neighbor network node and timing of broadcasting the second synchronization frame from the neighbor network node;

determining the second scheduled wakeup time of the neighbor network node based on the second state information;

calculating a time difference between the second scheduled wakeup time of the network node and the first scheduled wakeup time of the network node; and adjusting timing of the synchronization interval time period of the network node based on the time difference.

2. The method of claim 1 further comprising:

scheduling a next wakeup time for the network node to initiate a next synchronization interval time period based on the timing of the synchronization interval time period; and entering a sleep state until the next wakeup time for the network node.

3. The method of claim 2, wherein adjusting the timing of the synchronization interval for the next synchronization interval time period includes:

dividing the time difference by a factor of two; and adjusting the timing of the synchronization interval time period for the network node by one-half of the time difference.

4. The method of claim 1, wherein adjusting the timing of the synchronization interval time period includes:

subtracting one-half of the time difference from the synchronization interval time period based on the second scheduled wakeup time occurring before the first scheduled wakeup time; and adding one-half of the time difference to the synchronization interval time period based on the second scheduled wakeup time occurring after the first scheduled wakeup time.

5. The method of claim 1 further comprising:

providing a guard interval to account for clock drift between the network nodes communicating on the wireless radio network.

6. The method of claim 5, wherein the guard interval is set equal to double the clock drift between the network nodes.

7. The method of claim 5, wherein the synchronization window initiates upon expiration of the guard interval.

8. The method of claim 1, wherein receiving the second synchronization frame includes:

broadcasting a first synchronization frame comprising first state information of the network node to the neighbor network nodes, the first state information including a first time lapse between the first scheduled wakeup time and timing of broadcasting the first synchronization frame.

9. The method of claim 8, wherein timing of broadcasting the first synchronization frame is distributed randomly within the synchronization window.

10. A system configured for implementing a network node in a mesh network, the system comprising:

a processor;

a memory;

an internal clock; and a radio for communicating with a plurality of network nodes over a wireless radio network, wherein each network node on the wireless radio network communicates with neighbor network nodes using broadcast network messages, and each network node is configured for rebroadcasting network messages it receives to the neighbor network nodes on the wireless radio network, wherein the system is configured to implement a network node for performing operations comprising:

configuring the network node to wake up at a first scheduled wakeup time to synchronize communications with the neighbor network nodes during a synchronization interval time period comprising an interval between successive time periods in which the network node is scheduled to wake up;

at a time before a synchronization window expires, receiving a second synchronization frame comprising second state information broadcast from a neighbor network node, the second state information including a second time lapse between a second scheduled wakeup time for the neighbor network node and timing of broadcasting the second synchronization frame from the neighbor network node;

determining the second scheduled wakeup time of the neighbor node based on the second state information;

calculating a time difference between the second scheduled wakeup time of the network node and the first scheduled wakeup time of the network node; and adjusting timing of the synchronization interval time period of the network node based on the time difference.

11. The system of claim 10, wherein the operations further comprise:

scheduling a next wakeup time for the network node to initiate a next synchronization interval time period based on the timing of the synchronization interval time period; and entering a sleep state until the next scheduled wakeup time for the network node.

12. The system of claim 11, wherein timing of the next synchronization interval is determined based on averaging the time difference between the first scheduled wakeup time and the second scheduled wakeup time.

13. The system of claim 10, wherein the operation of adjusting the timing of the synchronization interval time period comprises:

dividing the time difference by a factor of two; and adjusting the timing of the synchronization interval time period for the network node by one-half of the time difference.

14. The system of claim 10, wherein the operation of adjusting the timing of the synchronization interval time period includes:

subtracting one-half of the time difference from the synchronization interval time period based on the second scheduled wakeup time occurring before the first scheduled wakeup time; and adding one-half of the time difference to the synchronization interval time period based on the second scheduled wakeup time occurring after the first scheduled wakeup time.

15. The system of claim 10, wherein the operations further comprise:
- providing a guard interval to account for clock drift between the network nodes.

16. The system of claim 15, wherein the synchronization window initiates upon expiration of the guard interval.

17. The system of claim 10, wherein the operation of receiving the second synchronization frame includes:
- broadcasting a first synchronization frame comprising first state information of the network node to the neighbor network nodes, the first state information including a first time lapse between the first scheduled wakeup time and timing of broadcasting the first synchronization frame.

18. A non-transitory computer readable storage medium storing programmed computer code, which when executed by a processor performs operations comprising:
- configuring a network node of a plurality of network nodes in a wireless radio network to wake up at a first scheduled wakeup time to synchronize communications with neighbor network nodes during a synchronization interval time period comprising an interval between successive time periods in which the network node is scheduled to wake up, wherein the network node includes a processor and a memory and is configured to communicate with the neighbor network nodes in the plurality of network nodes;
- at a time before a synchronization window expires, receiving a second synchronization frame comprising second state information broadcast from a neighbor network node, the second state information including a second time lapse between a second scheduled wakeup time for the neighbor network node and timing of broadcasting the second synchronization frame from the neighbor network node;
- determining the second scheduled wakeup time of the neighbor node based on the second state information;
- calculating a time difference between the second scheduled wakeup time of the network node and the first scheduled wakeup time of the network node; and
- adjusting timing of the synchronization interval time period of the network node based on the time difference.

19. The non-transitory computer readable storage medium of claim 18, wherein the operations further comprise:
- scheduling a next wakeup time for the network node to initiate a next synchronization interval time period based on the adjusted timing of the synchronization interval time period; and
- entering a sleep state until the next scheduled wakeup time for the network node.

20. The non-transitory computer readable storage medium of claim 18, wherein the operation of receiving the second synchronization frame includes:
- broadcasting a first synchronization frame comprising first state information of the network node to the neighbor network nodes, the first state information including a first time lapse between the first scheduled wakeup time and timing of broadcasting the first synchronization frame.

* * * * *